C. F. L. RISCH.
Corn-Planters.
No. 148,246.
2 Sheets--Sheet 2.
Patented March 3, 1874.
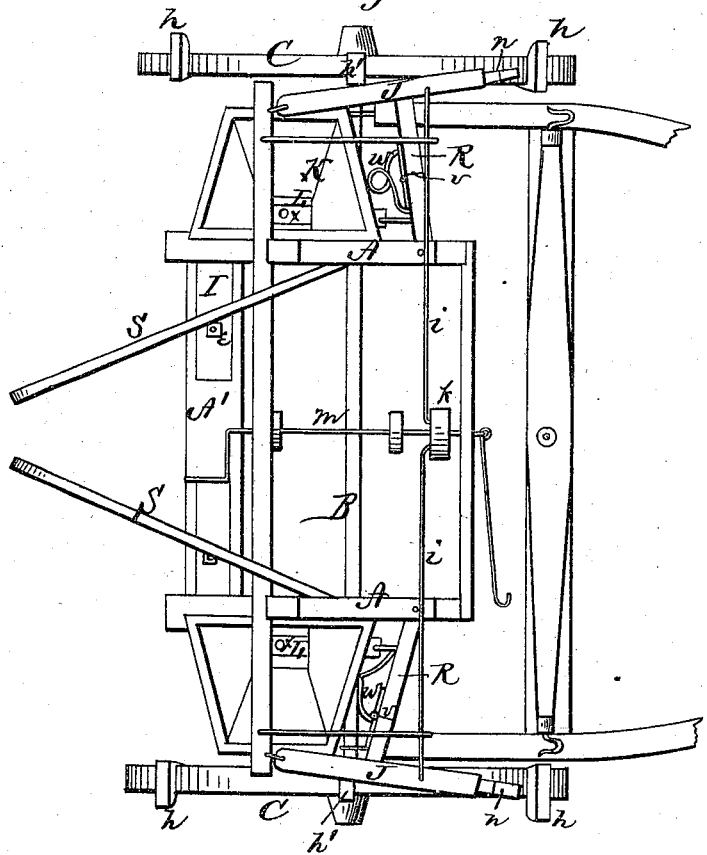
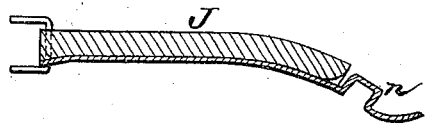
WITNESSES.
INVENTOR
Conrad F. L. Risch.
By Alexander Mator
Attorneys

UNITED STATES PATENT OFFICE

CONRAD F. L. RISCH, OF HOLLAND, INDIANA.

IMPROVEMENT IN CORN-PLANTERS.

Specification forming part of Letters Patent No. 148,246, dated March 3, 1874; application filed September 24, 1873.

*To all whom it may concern:*

Be it known that I, CONRAD F. L. RISCH, of Holland, in the county of Dubois and in the State of Indiana, have invented certain new and useful Improvements in Corn and Seed Planter; and do hereby declare that the following is a full, clear, and exact description thereof, reference being had to the accompanying drawings, and to the letters of reference marked thereon, making a part of this specification.

The nature of my invention consists in the construction and arrangement of a corn and seed planter, as will be hereinafter more fully set forth.

In order to enable others skilled in the art to which my invention appertains to make and use the same, I will now proceed to describe its construction and operation, referring to the annexed drawings, in which—

Figure 1 is a side elevation, Fig. 2 a rear elevation, and Fig. 3 a plan view, of my machine. Fig. 4 is a longitudinal section through one of the locking-bars of the machine.

A represents the frame-work of my machine in suitable boxes, upon the under side of which is placed the axle B, having a driving-wheel, C, firmly secured upon each end. D represents a cast-iron plate, the front edge of which is formed into a tube, $a$, with a funnel, E, inserted in its upper end. Into this funnel the corn falls, and then through the tube into the furrow behind the plowshare, which plowshare will be fastened to the lower end of the tube $a$. Behind the plowshare is fastened the shovel G for covering the corn, and behind the shovel is attached a roller, H, for the purpose of crushing the lumps of earth in the row, and to balance the machine. The shovel G and roller H are both attached to the plate D, and, in a full-sized machine, will be so arranged that they can be raised or lowered, as desired. The plate D is fastened in a forked bar, I, with two pins—one, $b$, of iron, above, and one, $d$, of wood, below. If the plow runs against a root, stump, or other obstruction, the wooden pin $d$ breaks and the plow turns back without suffering any damage, and the driver has only to put another pin in the place of the one broken. In my machine there are two of these plates D, with their attachment— one on each side of the frame—and the description of one, with the dropping mechanism for the same, will suffice for both, they being exactly alike. The bar I, to which the plate D is attached, is bent at right angles, the lower end of the vertical part being forked to receive the plate D, and the horizontal part of said bar slides in a recess made in the rear cross-bar A' of the frame A. This cross-bar is slotted under this part of the bar I, and a bolt, $e$, passing through secures the bar, by a nut, in any position desired. The bars I I can, therefore, be moved out or in, as desired, to get any required distance between the rows. The driving-wheels C C being set a certain unchangeable distance apart the driver can readily determine what distance to drive from the last row, according to the distance desired between the rows. Both of the wheels C C stand exactly alike, spoke against spoke, and turn both at the same time. They are provided with six spokes each, and each spoke is, on the inner side next to the machine, provided with a projection, $f$, made of wire or other suitable material. The projection on every alternate spoke is stationary, while on the others they are movable. If all the projections $f\,f$ are in their places, the machine will drop six times by each revolution of the wheel; but, if the alternate projections are moved out of their places, the machine will only drop three times by each revolution of the wheels, and the hills will hence be double the distance apart. On the tire or hoop of each wheel C are fixed alternately three larger and three smaller pieces, $h$ and $h'$, of iron. All of these pieces or cogs serve the purpose of keeping the wheels from slipping. The larger cogs $h\,h$ serve to make a mark in the wheel-track where the corn is dropped in the row, so that the driver can see the run of the cross-rows. The smaller cogs $h'\,h'$ serve to lock the wheels. Above each wheel C is a brake, J, hinged or pivoted to a projecting cross-bar on the main frame. From each of these brakes a rod, $i$, extends to the center of the machine, and the rods connect on opposite sides to a disk, $k$, placed on a crank-shaft, $m$. By turning this shaft $m$, the brakes are pushed over the wheels, and a spring-hook, $n$, on each catches on one of the small cogs $h'$, and both wheels become locked. By this arrangement, the corn can be planted so correct that it can be plowed both ways without any difficulty. On each side of the machine is a corn box or hopper, K, provided with a hole or aperture in its bottom directly over the funnel E, a hinged valve, p, on the under side of the hopper-bottom closing said aperture. L is a slide, with an aperture, x, moving on top of the hopper-bottom. The valve p and slide L are so arranged with relation to each other that, when the valve is closed, the aperture x in the slide will be directly over the aperture in the hopper-bottom, allowing a certain quantity of corn to pass down onto the valve, and as soon as the slide is moved to cut off the corn the valve opens and lets the corn on the same drop down into the funnel E and through the tube a into the ground.

The valve and slide are operated by the following means: The front end of the slide L is connected by a rod, s, with an arm, t, on an upright rock-shaft, P, in the frame A, and also by a rod, s', with the outer end of the hinged valve p. The rock-shaft P is provided with another horizontal arm, R, which is jointed at v, and provided with a spring, w. y and y' are other springs, arranged to throw the slide rearward and close the valve. Now, as the driving-wheel C revolves, the projections f on its spokes strike the arm R and turn the rock-shaft P, which moves the slide L forward and opens the valve p. As soon as the projection has passed the arm R, the springs y y' throw the slide L and valve p back in their former positions.

In backing the machine, the joint v prevents any breakage of parts, and allows the projections f to pass the arm R without interfering with the dropping mechanism.

To the back end of the machine are attached two handles, S S', to be used for regulating the depth of the plows. A seat for the driver may be arranged on the shafts, if so desired.

The same machine may be used for planting sorghum, broom-corn, or other seed, by regulating the openings in the bottoms of the hoppers.

Having thus fully described my invention, what I claim as new, and desire to secure by Letters Patent, is—

1. The plate D, cast with the tube a, and provided with the funnel E, plow G, and roller H, all substantially as and for the purposes herein set forth.

2. The brakes J J, with spring-hooks n n, in combination with the rods i i, disk k, and shaft m, for the purposes herein set forth.

3. The combination, with the slide L and valve p, of the rods s s', arms t, hinged arm R, rock-shaft P, the springs w y y', and the projections f f on the wheel C, all constructed and arranged substantially as and for the purposes herein set forth.

In testimony that I claim the foregoing I have hereunto set my hand this 19th day of August, 1873.

C. F. L. RISCH.

Witnesses:
W. F. OTTE,
HENRY BRÜNING.